United States Patent
Yin et al.

(10) Patent No.: US 10,846,388 B2
(45) Date of Patent: *Nov. 24, 2020

(54) VIRTUAL REALITY ENVIRONMENT-BASED IDENTITY AUTHENTICATION METHOD AND APPARATUS

(71) Applicant: Advanced New Technologies Co., Ltd., George Town (KY)

(72) Inventors: Huanmi Yin, Hangzhou (CN); Feng Lin, Hangzhou (CN); Zhongzheng Ye, Hangzhou (CN); Lei Wang, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,944

(22) Filed: Jul. 10, 2019

(65) Prior Publication Data

US 2019/0332758 A1 Oct. 31, 2019

Related U.S. Application Data

(63) Continuation of application No. PCT/CN2018/078904, filed on Mar. 14, 2018.

(30) Foreign Application Priority Data

Mar. 15, 2017 (CN) .......................... 2017 1 0154808

(51) Int. Cl.
*G06F 21/32* (2013.01)
*G06T 7/246* (2017.01)
(Continued)

(52) U.S. Cl.
CPC .............. *G06F 21/32* (2013.01); *G06F 3/013* (2013.01); *G06K 9/0061* (2013.01);
(Continued)

(58) Field of Classification Search
CPC ........ G06F 21/64; G06F 3/0484; G06F 3/013; G06Q 20/3278; G09G 5/395
(Continued)

(56) References Cited

U.S. PATENT DOCUMENTS 8,625,847 B2 * 1/2014 Pasquero ................ G06F 3/013
382/103
9,274,599 B1 3/2016 D'Amico et al.
(Continued)

FOREIGN PATENT DOCUMENTS

CN 101904106 12/2010
CN 103455746 12/2013
(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.
(Continued)

*Primary Examiner* — Bryan F Wright
(74) *Attorney, Agent, or Firm* — Fish & Richardson P.C.

(57) ABSTRACT

In an implementation, user identity authentication in a virtual reality (VR) environment is described. A user identity authentication request is received by a VR terminal device. A prompt interface configured to notify a user to complete collection of an eye physiological feature in the VR environment is presented by the VR terminal device. The prompt interface comprises a virtual eye model. The presentation of the virtual eye model is changed by the VR terminal device to correspond to eye movement of the user. Multiple cameras are invoked by the VR terminal device to collect eye images of the user. The eye images are processed by the VR terminal device to extract the eye physiological feature of the user. An identity authentication on the user is performed
(Continued)

by the VR terminal device based on the eye physiological feature.

20 Claims, 6 Drawing Sheets

(51) Int. Cl.
  *G06F 3/01* (2006.01)
  *G06K 9/00* (2006.01)
  *G06Q 20/38* (2012.01)
  *G06T 11/00* (2006.01)
  *H04N 5/247* (2006.01)
  *H04N 5/235* (2006.01)
  *G09G 5/395* (2006.01)
  *G06F 21/64* (2013.01)

(52) U.S. Cl.
  CPC ..... *G06K 9/00617* (2013.01); *G06K 9/00912* (2013.01); *G06Q 20/3821* (2013.01); *G06T 7/246* (2017.01); *G06T 11/00* (2013.01); *H04N 5/247* (2013.01); *G06F 21/64* (2013.01); *G06T 2207/30201* (2013.01); *G09G 5/395* (2013.01); *H04N 5/2351* (2013.01); *H04N 5/2354* (2013.01)

(58) Field of Classification Search
  USPC .......................................................... 726/18
  See application file for complete search history.

(56) References Cited

U.S. PATENT DOCUMENTS

| | | | |
|---|---|---|---|
| 9,360,682 B1 | 6/2016 | Edwards | |
| 9,576,285 B2* | 2/2017 | Zhou | G06Q 20/3278 |
| 9,785,250 B1 | 10/2017 | Staton et al. | |
| 10,039,445 B1 | 8/2018 | Torch | |
| 2003/0091215 A1 | 5/2003 | Lauper et al. | |
| 2008/0037835 A1 | 2/2008 | Lee et al. | |
| 2010/0074477 A1* | 3/2010 | Fujii | G06K 9/00604 382/117 |
| 2011/0213664 A1 | 9/2011 | Osterhout et al. | |
| 2011/0227741 A1* | 9/2011 | Jeon | B60R 25/102 340/573.1 |
| 2012/0066757 A1 | 3/2012 | Vysogorets et al. | |
| 2012/0154277 A1 | 6/2012 | Bar-Zeev et al. | |
| 2013/0005443 A1 | 1/2013 | Kosta et al. | |
| 2013/0044130 A1 | 2/2013 | Geisner et al. | |
| 2013/0114850 A1 | 5/2013 | Publicover et al. | |
| 2013/0169683 A1* | 7/2013 | Perez | G06F 3/013 345/633 |
| 2013/0197968 A1 | 8/2013 | Davis et al. | |
| 2013/0232430 A1* | 9/2013 | Reitan | G06F 3/0484 715/765 |
| 2014/0055591 A1* | 2/2014 | Katz | G06F 3/013 348/78 |
| 2014/0055746 A1 | 2/2014 | Nistico et al. | |
| 2014/0125574 A1 | 5/2014 | Scavezze et al. | |
| 2014/0197922 A1 | 7/2014 | Stanwood et al. | |
| 2014/0226000 A1 | 8/2014 | Vilcovsky et al. | |
| 2015/0139509 A1* | 5/2015 | Yang | G02B 27/017 382/117 |
| 2015/0201835 A1 | 7/2015 | Border et al. | |
| 2015/0205348 A1 | 7/2015 | Nortrup et al. | |
| 2015/0241965 A1 | 8/2015 | Nortrup et al. | |
| 2015/0260986 A1 | 9/2015 | Nortrup et al. | |
| 2015/0309705 A1 | 10/2015 | Keeler et al. | |
| 2015/0326570 A1* | 11/2015 | Publicover | G06F 21/64 726/4 |
| 2016/0014121 A1 | 1/2016 | Perna et al. | |
| 2016/0018645 A1 | 1/2016 | Haddick et al. | |
| 2016/0019423 A1 | 1/2016 | Ortiz et al. | |
| 2016/0026253 A1 | 1/2016 | Bradski et al. | |
| 2016/0063767 A1 | 3/2016 | Lee et al. | |
| 2016/0116979 A1 | 4/2016 | Border | |
| 2016/0124501 A1* | 5/2016 | Lam | G02B 27/017 345/156 |
| 2016/0225164 A1 | 8/2016 | Tomlin et al. | |
| 2016/0246367 A1 | 8/2016 | Tungare et al. | |
| 2016/0260206 A1 | 9/2016 | Jung et al. | |
| 2016/0260258 A1 | 9/2016 | Lo et al. | |
| 2016/0267716 A1* | 9/2016 | Patel | G09G 5/395 |
| 2016/0300388 A1 | 10/2016 | Stafford et al. | |
| 2016/0307038 A1 | 10/2016 | Skogo et al. | |
| 2016/0342782 A1 | 11/2016 | Mullins et al. | |
| 2016/0343168 A1 | 11/2016 | Mullins et al. | |
| 2016/0371555 A1 | 12/2016 | Derakhshani et al. | |
| 2017/0011263 A1 | 1/2017 | Andersen et al. | |
| 2017/0358141 A1 | 12/2017 | Stafford et al. | |
| 2017/0364732 A1* | 12/2017 | Komogortsev | G06K 9/00604 |
| 2018/0029319 A1 | 2/2018 | Kalima et al. | |
| 2018/0121724 A1 | 5/2018 | Oviannikov et al. | |
| 2018/0150690 A1 | 5/2018 | Yin | |
| 2018/0150691 A1 | 5/2018 | Wu et al. | |
| 2018/0253897 A1* | 9/2018 | Satake | A63F 13/5255 |
| 2018/0323972 A1* | 11/2018 | Reed | G06F 3/013 |
| 2019/0260981 A1* | 8/2019 | Ollila | H04N 13/25 |

FOREIGN PATENT DOCUMENTS

| | | |
|---|---|---|
| CN | 103870738 | 6/2014 |
| CN | 105183147 | 12/2015 |
| CN | 105427107 | 3/2016 |
| CN | 105635093 | 6/2016 |
| CN | 105912110 | 8/2016 |
| CN | 105930816 | 9/2016 |
| CN | 105955491 | 9/2016 |
| CN | 106022036 | 10/2016 |
| CN | 106156578 | 11/2016 |
| CN | 106203372 | 12/2016 |
| CN | 106203410 | 12/2016 |
| CN | 107122642 | 9/2017 |
| GB | 2317528 | 3/1998 |
| JP | 2009199392 | 9/2009 |
| JP | 2014092940 | 5/2014 |
| JP | 2015012304 | 1/2015 |
| TW | 200701104 | 1/2007 |
| TW | M514608 | 12/2015 |
| TW | 201631534 | 9/2016 |
| WO | WO 2016010721 | 1/2016 |
| WO | WO 2016058528 | 4/2016 |
| WO | WO 2016183020 | 11/2016 |
| WO | WO 2016183541 | 11/2016 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/078904, dated Jun. 13, 2018, 10 pages (with partial English translation).

Extended European Search Report in European Application No. 18768201.8, dated Oct. 2, 2019, 13 pages.

PCT International Preliminary Report on Patentability in International Application No. PCT/CN2018/078904, dated Sep. 17, 2019, 9 pages (with English translation).

U.S. Appl. No. 15/819,041, Jun Wu et al., filed Nov. 21, 2017.

Extended European Search Report in European Application No. 17875636.7, dated Oct. 28, 2019, 8 pages.

Extended European Search Report in European Application No. 17877053.3, dated Dec. 2, 2019, 9 pages.

International Preliminary Report on Patentability in International Application No. PCT/US2017/063223, dated Jan. 15, 2019, 17 pages.

International Preliminary Report on Patentability in International Application No. PCT/US2017/063226, dated Jan. 24, 2019, 24 pages.

International Search Report and Written Opinion of the International Searching Authority issued in International Application No. PCT/US2017/063223 dated Feb. 9, 2018; 10 pages.

(56) References Cited

OTHER PUBLICATIONS

International Search Report and Written Opinion of the International Searching Authority issued in International Application No. PCT/US2017/063226 dated Feb. 14, 2018; 7 pages.

* cited by examiner

VIRTUAL REALITY ENVIRONMENT-BASED IDENTITY AUTHENTICATION METHOD AND APPARATUS

CROSS-REFERENCE TO RELATED APPLICATIONS

This application is a continuation of PCT Application No. PCT/CN2018/078904, filed on Mar. 14, 2018, which claims priority to Chinese Patent Application No. 201710154808.9, filed on Mar. 15, 2017, and each application is hereby incorporated by reference in its entirety.

TECHNICAL FIELD

The present application relates to the field of computer applications, and in particular, to a virtual reality environment-based identity authentication method and apparatus.

BACKGROUND

A virtual reality (VR) technology is a technology that generates an interactive three-dimensional interaction environment on a computer by using a computer graphics system and various control interfaces, and that provides an immersion sense for a user. With the development of the VR technology and hardware, application scenarios of the VR technology are increasingly abundant.

However, although the VR technology can provide a user with a lifelike immersion sense, if the user needs to perform a target service that requires security authentication in a VR scene when the user experiences immersion by wearing a VR terminal device, quickly performing security authentication on the target service (such as a payment service) is of great significance in improving user experience.

SUMMARY

The present application proposes a virtual reality environment-based identity authentication method, where the method is applied to a virtual reality terminal device and includes the following: receiving a user identity authentication request; outputting a prompt interface that is used to notify a user that collection of an eye physiological feature is completed in a virtual reality environment, where the prompt interface includes a virtual eye model, and when the user's eye moves, the virtual eye model simulates an eye action of the user; collecting the eye physiological feature of the user; and performing identity authentication on the user based on the collected eye physiological feature.

The present application further proposes a virtual reality environment-based identity authentication apparatus, where the apparatus is applied to a virtual reality terminal device and includes the following: a receiving module, configured to receive a user identity authentication request; an output module, configured to output a prompt interface that is used to notify a user that collection of an eye physiological feature is completed in a virtual reality environment, where the prompt interface includes a virtual eye model, and when the user's eye moves, the virtual eye model simulates an eye action of the user; a first collection module, configured to collect the eye physiological feature of the user; and an authentication module, configured to perform identity authentication on the user based on the collected eye physiological feature.

In the present application, after receiving the user identity authentication request, the virtual reality terminal device can output the prompt interface that is used to notify the user that collection of the eye physiological feature is completed in the virtual reality environment. The prompt interface includes the virtual eye model that simulates the eye action of the user. The virtual reality terminal device collects the eye physiological feature of the user, and performs identity authentication on the user based on the collected eye physiological feature.

In one aspect, the virtual eye model that simulates the eye action of the user in real time is output in the virtual reality environment. As such, the user can view an eye action of the user in real time in the virtual reality environment in a process of collecting the eye physiological feature, and further, under a prompt of the virtual eye model, the user can adjust an eye posture in a timely way to improve precision of collecting the eye physiological feature.

In another aspect, the eye physiological feature of the user is collected, and identity authentication is performed on the user based on the collected eye physiological feature. As such, user identity authentication can be quickly completed in the virtual reality environment, and interaction complexity during user identity authentication is reduced.

DESCRIPTION OF IMPLEMENTATIONS

Figure 1:
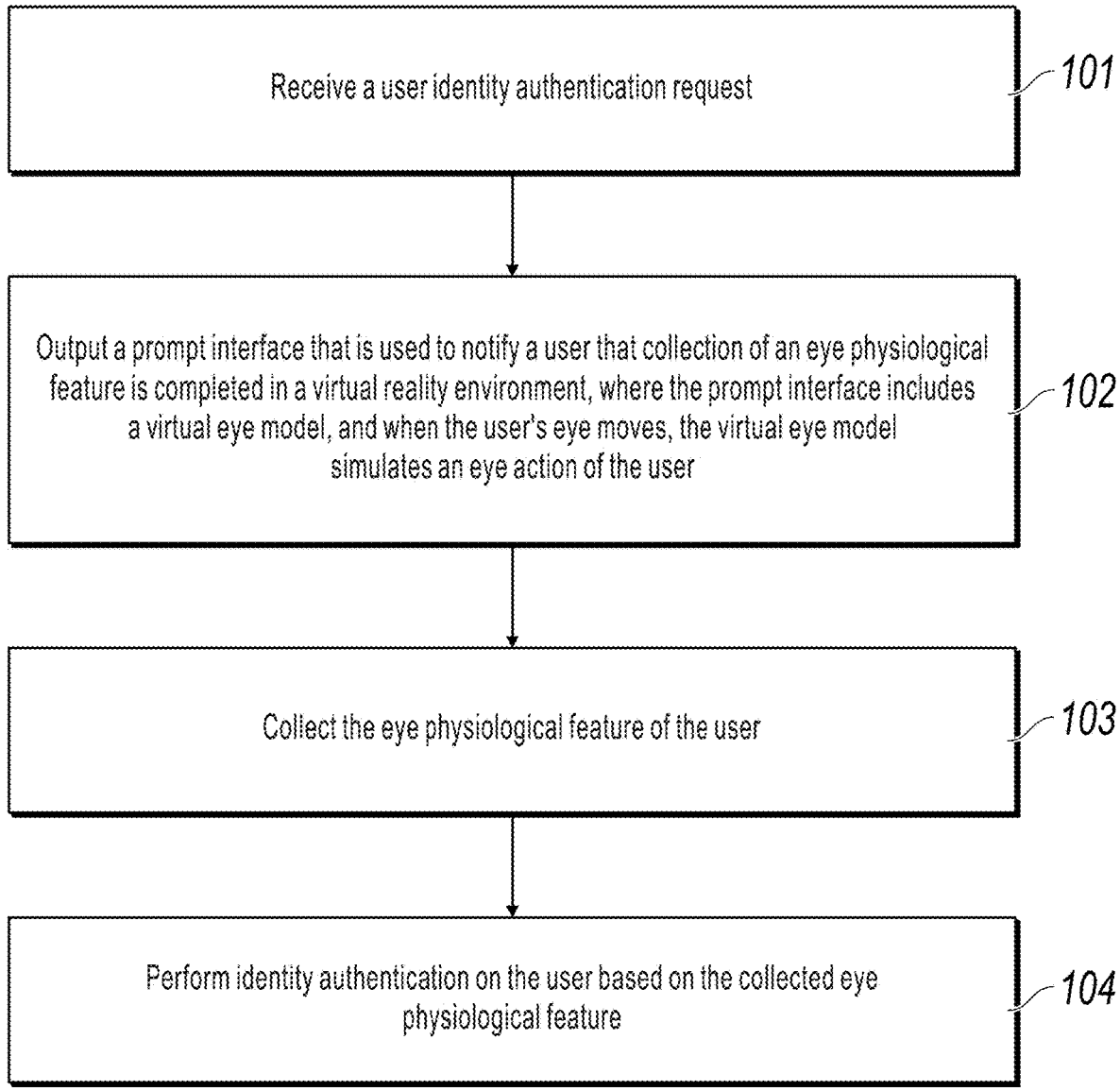
FIG. 1 is a flowchart illustrating a VR environment-based identity authentication method, according to an implementation of the present application.

The present application is intended to propose a technical solution for outputting a virtual eye model that simulates an eye action of a user in real time in a VR environment, so as to notify the user that collection of an eye physiological feature is completed, and perform identity authentication on the user based on the collected eye physiological feature.

After receiving a user identity authentication request, a virtual reality terminal device can output a prompt interface that is used to notify a user that collection of an eye physiological feature is completed in a virtual reality environment. The prompt interface includes a virtual eye model that simulates an eye action of the user. The virtual reality terminal device collects the eye physiological feature of the user, and performs identity authentication on the user based on the collected eye physiological feature.

In one aspect, the virtual eye model that simulates the eye action of the user in real time is output in the virtual reality environment. As such, the user can view an eye action of the user in real time in the virtual reality environment in a process of collecting the eye physiological feature, and further, under a prompt of the virtual eye model, the user can adjust an eye posture in a timely way to improve precision of collecting the eye physiological feature.

In another aspect, the eye physiological feature of the user is collected, and identity authentication is performed on the user based on the collected eye physiological feature. As such, user identity authentication can be quickly completed in the virtual reality environment, and interaction complexity during user identity authentication is reduced.

For example, the technical solutions of the present application are applied to quick payment in a VR environment. After the user triggers a quick payment service in the VR environment, a user identity authentication request can be initiated to a VR terminal device by using a payment client device. After receiving the user identity authentication request, the VR terminal device can output a virtual eye model that simulates an eye action of the user in real time in the VR environment, to notify the user that collection of an eye physiological feature is completed. The eye physiological feature of the user is collected by using the eye identification hardware carried in the VR terminal device (such as an eye print feature and an iris feature), and then identity authentication is performed on the user by using the collected eye physiological feature, so that the user no longer needs to enter a payment password in a complex interaction way in the VR environment to perform identity authentication on the user. In addition, in a process of collecting an eye physiological feature, the user can view an eye action of the user in real time, and then the user can adjust an eye posture in a timely way under a prompt of the virtual eye model to improve precision of collecting the eye physiological feature.

The following describes the present application by using specific implementations with reference to specific application scenarios.

FIG. 1 illustrates a virtual reality environment-based identity authentication method, according to an implementation of the present application. The method is applied to a VR terminal device, and includes the following steps:

Step 101: Receive a user identity authentication request.

Step 102: Output a prompt interface that is used to notify a user that collection of an eye physiological feature is completed in a virtual reality environment, where the prompt interface includes a virtual eye model, and when the user's eye moves, the virtual eye model simulates an eye action of the user.

Step 103: Collect the eye physiological feature of the user.

Step 104: Perform identity authentication on the user based on the collected eye physiological feature.

The VR terminal device includes any form of terminal device that can provide VR three-dimensional immersion experience for a user, for example, a head-mounted VR terminal device.

In practice, client software (such as an APP) or an operating system developed based on the VR technology can be carried on the previous VR terminal device in advance. The VR terminal device can output a VR scene model developed by a developer in advance to the user by using the carried client software or operating system, so that a user wearing the VR terminal device can experience three-dimensional immersion in the VR environment.

The eye can include at least one of an eyelid, an eye corner, an iris, a sclera, etc. of the user. The eye action can include at least one of an eyeball rotation action, an eye blinking action, or an eye opening action of the user.

The user identity authentication request is a request message that is initiated by the user in the VR environment and used to authenticate an identity of the user. In practice, after the user triggers a target service that requires authentication on the identity of the user in the VR environment, an identity authentication request can be initiated by using the client software or operating system carried in the VR terminal device.

The target service can include a local task of authenticating the identity of the user that is initiated by the user in the VR environment, or can include an online task of authenticating the identity of the user that is initiated by the user in the VR environment.

For example, in practice, the previous target service can be a quick payment service in some specific VR scenes, for example, order payment in a VR shopping scenario, rewarding in a VR live broadcasting scenario, recharging in a VR game scenario, and video on demand payment in a VR video scenario. Alternatively, target services can include other types of local services than the quick payment service that require authentication on the identity of the user, for example, an unlocking service of the user for the VR terminal device.

The following describes the technical solutions of the present application in detail in four phases: creation of a VR scene model, initiation of identity authentication, collection and registration of an eye physiological feature, and authentication on a user identity.

(1) Creation of a VR Scene Model

In this implementation, a developer can complete creation of a VR scene model by using a specific modeling tool. The modeling tool is not limited in this implementation. For example, a developer can use relatively mature modeling tools such as Unity, 3dsMax, and Photoshop to complete creation of a VR scene model.

In a process that a developer creates a VR scene model by using a modeling tool, the VR scene model, a texture of the VR scene, and a map of the VR scene can be derived from a real scene in a real life. For example, a material, a texture, and a map and a plane model of a real environment can be collected in advance through video shooting. Then, a modeling tool such as Photoshop or 3dmax is used to process a texture and construct a three-dimensional model of a real environment, and then is imported to a unity3D platform (U3D for short). Image rendering is performed in a plurality of dimensions such as a sound effect, a graphical interface, plug-ins, and light, and then interaction code is written. Finally, modeling of a VR scene model is completed.

In this implementation, to enable a user to execute the previous target service in the VR environment, the developer can further create a 2D or 3D service interface that corresponds to the previous target service in the VR scene model by using the previous modeling tool in addition to creating a VR environment model.

For example, in a shown implementation, the previous service interface can be a quick payment interface created based on the modeling tool, for example, a virtual checkout counter interface. The user can interact with the payment interface with a specific interaction operation (for example, locating the operation focus in the payment interface), to trigger quick payment in the VR environment.

(2) Initiation of Identity Authentication

In this implementation, after the developer completes the modeling of the VR scene model and the service interface, the VR client device can output the VR scene model and the service interface to the user by using the client software or the operating system carried in the VR terminal device.

It is worthwhile to note that, by default, the VR terminal device can output only the VR scene model to the user. In a process that the user experiences immersion in the VR scene, the user can interact with the VR terminal device to trigger the VR terminal device to output the service interface in the VR scene.

In this implementation, a predetermined virtual element used to trigger the previous target service can be provided in the VR scene model. In a process that the user experiences immersion in the VR scene, if the target service needs to be executed, the user can manipulate sensing hardware, such as a gyroscope carried in the VR terminal device, in a specific interaction way and select the virtual element to trigger the target service.

The specific interaction way used when the user triggers the previous target service in the VR scene is not limited in the present application. In practice, a person skilled in the art can select an appropriate interaction way based on an actual requirement.

For example, in practice, the user can control motion of a visual focus in an interaction way such as a three-dimensional gesture, a head posture, or eyeball movement (eye movement tracking) or by using an external control apparatus of a VR terminal device, keep a visual focus in an area where the virtual element is located, and select the virtual element, to trigger the previous target service. Alternatively, the user can select the target service by passing the moving track of the visual focus in a specific way through the area where the virtual element is located, to trigger the target service.

A specific implementation process of selecting the previous virtual element in the previous interaction way to control motion of the visual focus is omitted in the present application for simplicity. For the process, a person skilled in the art can make references to records in the related technology.

Certainly, in addition to the interaction way shown above, if the user is expected to trigger the previous target service more naturally, the previous VR client device can also carry a voice recognition module. In this case, in a process that the user experiences immersion in a VR scene, the previous target service can be triggered by directly sending a voice instruction used to trigger the previous target service.

After the user triggers the previous target service in the VR scene, because the target service is a service that requires security authentication on the user identity, in this case, the user can initiate a user identity authentication request to the VR terminal device by using client software or an operating system carried in the VR terminal device.

(3) Collection and Registration of an Eye Physiological Feature

In this implementation, to more quickly perform security authentication on an identity of a user in a VR scene environment, eye recognition hardware carried in the VR terminal device can be used to collect an eye physiological feature of the user, and quickly complete identity authentication on the user by using the collected eye physiological feature.

In practice, there can be a plurality of eye physiological features collected by the VR terminal device. For example, in a shown implementation, both eye print features and iris features of the user can be included. Iris recognition and eye print recognition are organically combined, so the iris recognition and the iris recognition are complementary to each other. Therefore, precision of authenticating an identity of a user can be significantly improved.

The following uses an example that the previous eye physiological feature includes an iris feature and an eye print feature for description.

In this case, the eye recognition hardware can include lenses that are carried in a VR terminal device and that correspond to positions of the user's eyes, a visual module that is used to collect an eye print feature, and a visual module that is used to collect an iris feature.

The visual module that is used to collect an eye print feature can include an RGB camera used with a lens and an LED light source that is used to perform light compensation on the RGB camera and that is used with the RGB camera. The visual module that is used to collect an iris feature can include an infrared camera used with a lens and an infrared LED light source used to perform light compensation on the infrared camera and that is used with the infrared camera. That is, in the present application, the VR terminal device can simultaneously carry an RGB camera used to collect an eye print feature and an infrared camera used to collect an iris feature (for example, the RGB camera and the infrared camera can be separately installed at one of the positions of the VR terminal device that correspond to the user's eyes).

It is worthwhile to note that the previous eye recognition hardware carried in the VR terminal device can be built-in hardware in a hardware architecture of the VR terminal device or external hardware, or can be built-in hardware in a third-party mobile device (such as a smartphone) interconnected to the VR terminal device. Implementations are not limited in the present application.

In this implementation, in an initial status, the user can register the eye print feature and the iris feature of the user in advance by using the VR client device, and establish a binding relationship between the user identifier of the user and each of the eye print feature and the iris feature of the user on a service server.

The user identifier of the user can include account information used by the user when the user executes the previous target service. For example, when the target service is a payment service, the user identifier of the user can be a payment account of the user. The user can register an eye print and an iris, to bind the payment account to the eye print feature and the iris feature of the user on the service server.

After the user completes eye print and iris registration, when the user subsequently initiates a target service that requires identity authentication in the VR environment, identity authentication on the user can be performed by using the eye print feature and the iris feature of the user. As such, information such as a service password no longer needs to be entered for identity authentication on the user.

It is worthwhile to note that, the user can register the eye print feature and the iris feature in advance by using the VR terminal device and establish a binding relationship between the account information of the user and each of the eye print feature and the iris feature of the user by using the VR terminal device, as described above, and in addition, the user can customize an associated user by using the VR client device, and bind the eye print feature and the iris feature of the associated user to the user identifier of the user. For example, in practice, the user can also set a family member as an associated user, and can further bind an eye print feature and an iris feature of the family member to the account information of the user.

Certainly, in practice, to improve security of the eye print and iris registration process, before an eye print feature and an iris feature of the user are collected, identity authentication can be further performed for a registration behavior of the user. For example, the user can be prompted to enter a login password or other information that can represent an identity of a user, and authenticate an identity of a user who performs registration this time. After the authentication succeeds, the VR client device sends a registration message to a service server to complete eye print and iris registration.

As such, an unauthorized user can be prevented from using an eye print or iris feature of the user to complete binding to a login account of another authorized user, so that eye print and iris registration security can be improved.

In this implementation, in a process that the VR terminal device invokes the previous eye recognition hardware to collect an eye physiological feature of the user, to optimize precision of collecting the eye physiological feature, the VR terminal device can output a prompt interface that is used to notify the user that eye feature collection is completed in a VR environment. The previous prompt interface can be a 2D interface, or can be a 3D interface. Implementations are not limited in the present application.

Figure 2:
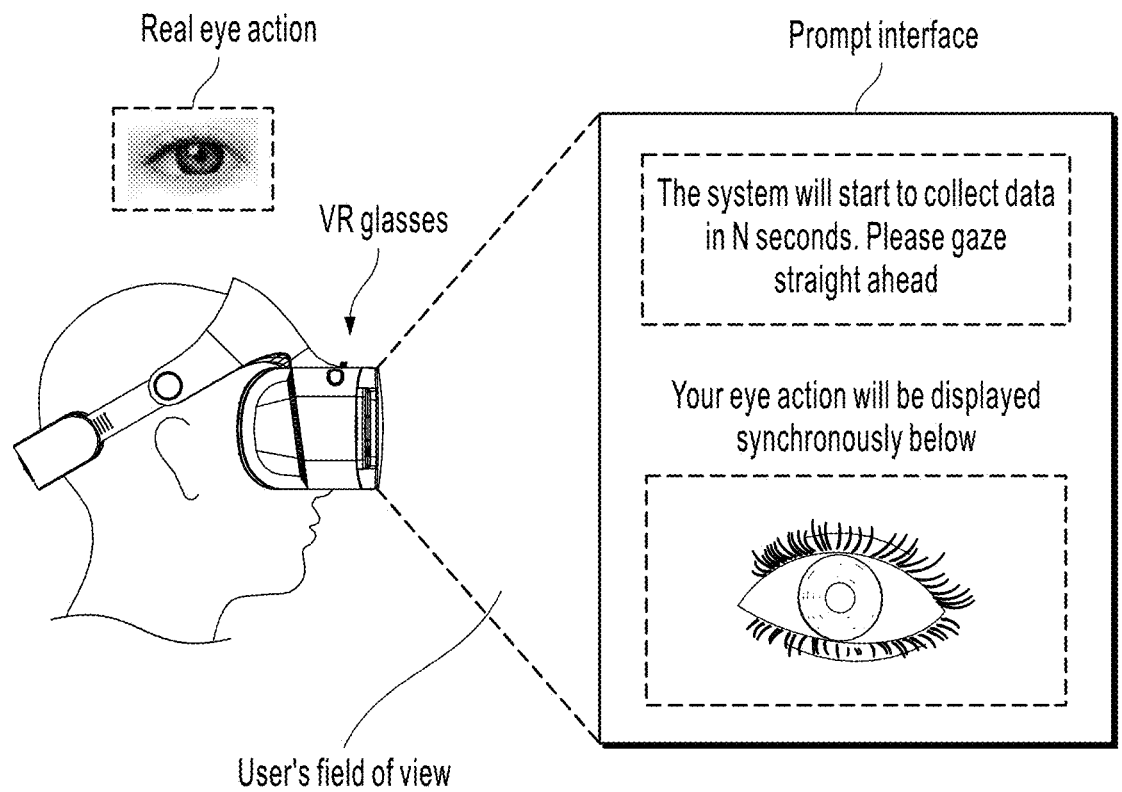
FIG. 2 is a schematic diagram illustrating a prompt interface output in a VR environment, according to an implementation of the present application.

FIG. 2 is a schematic diagram illustrating the previous prompt interface output in a VR environment, according to this implementation.

As shown in FIG. 2, the previous prompt interface output by the VR terminal device in the VR environment can include the following two parts of content:

In one aspect, the previous prompt interface can include prompt information used to notify the user that collection of an eye physiological feature is completed. The previous prompt information can include text prompt information that is output by the VR terminal device.

In practice, in the text prompt information, an eye action or a gaze direction that needs to be maintained by the user during collection of an eye physiological feature can be specified. Under a prompt of the text prompt information output by the VR terminal device, the user can maintain a specific eye action or gaze in a specific direction in a way specified in the text prompt information, to better complete eye physiological feature collection.

For example, as shown in FIG. 2, in practice, the previous prompt information can be text prompt information "The system will start to collect data in N seconds. Please gaze straight ahead".

In another aspect, the previous prompt interface can further include a virtual eye model in addition to the prompt information used to notify the user that collection of an eye physiological feature is completed. The virtual eye model can simulate the eye action of the user in real time when the user's eye moves.

The previous virtual eye model can be created by using a modeling tool carried in the VR terminal device. During implementation, the VR terminal device can extract several feature points from the eye image of the user, and then input the extracted feature point as an input parameter into the modeling tool carried in the VR terminal device to perform modeling, so as to complete creation of the virtual eye model.

A specific form of the virtual eye model is not limited in the present application.

For example, in practice, the previous modeling tool can be a 2D or 3D graphical modeling tool, and the previous virtual model can be a graphical modeling tool. Based on an input eye feature point of the user, a 2D or 3D eye image is drawn in a form of cartoon animation or image processing.

It is worthwhile to note that, because the virtual eye model is obtained through modeling based on feature points collected from the eye image of the user, created eye feature points in the virtual eye model are mapped to the feature points of the user's eye. That is, for each extracted eye feature point, one eye feature point that is mapped to the feature point can be identified in the virtual eye model.

In this implementation, after the VR terminal device outputs the previous prompt interface in the VR environment, the user can complete collection of an eye physiological feature under a prompt of the previous prompt interface.

In a process of collecting an eye physiological feature of the user, to enable a virtual eye model in the previous prompt interface to simulate an eye action of the user in real time, the VR terminal device can further collect eye action data of the user in real time, and adjust the virtual eye model based on the collected eye action data.

It is worthwhile to note that, in practice, eye actions of the user generally include an eyeball rotation action, an eye blinking action, an eye opening action, etc. The eye action data can include coordinate change data of eye feature points that are extracted from the collected eye image of the user and that correspond to an eyeball rotation action, an eye blinking action, and an eye opening action of the user.

For example, for the eyeball rotation action of the user, in the industry, motion tracking can usually be performed on the feature points extracted from an iris or a sclera of the user, to obtain the coordinate change data of these feature points to restore the eyeball rotation action of the user. Therefore, an eye feature point that corresponds to the eyeball rotation action of the user can be an iris feature point or a sclera feature point of the user.

For another example, for the eye blinking action or the eye opening action of the user, in the industry, motion tracking can usually be performed on the feature points extracted from an eyelid or an eye corner of the user, to obtain the coordinate change data of these feature points to restore the eye blinking action or the eye opening action of the user. Therefore, eye feature points that correspond to the eye blinking action and the eye opening action of the user can be eyelid feature points or eye corner feature points of the user.

In an implementation, during collection of an eye physiological feature of the user, the VR terminal device can invoke the camera to collect an eye image of the user in real time, and then extract an eye feature point that corresponds to the eye action of the user from the collected eye image.

For example, for the eyeball rotation action of the user, an iris feature point or a sclera feature point of the user can be extracted. For the eye blinking action and the eye opening action of the user, an eyelid feature point or an eye corner feature point of the user can be extracted.

After a corresponding eye feature point is extracted from the collected eye image, the VR terminal device can perform motion tracking on each extracted eye feature point based on a carried eye feature point tracking algorithm, collect coordinate data of each eye feature point in real time, and record a coordinate data change of each eye feature point in a back end, to obtain coordinate change data of each eye feature point.

After the VR terminal device collects the coordinate change data that corresponds to each extracted eye feature point, because the feature points in the virtual eye model are mapped to each other, the VR terminal device can further search the virtual eye model for the mapping feature points that correspond to the extracted eye feature points, and then synchronously adjust the positions of the identified mapping feature points based on the collected coordinate change data, to ensure that an eye action of the user simulated by the virtual eye model is consistent with an eye action actually generated by the user.

As such, it can be seen that in a process of collecting an eye physiological feature of the user, the user can view an eye action of the user in real time in a VR environment.

In one aspect, in a conventional biometric feature collection process, there is usually a delay of initialization of the collection hardware, that is, after the collection starts, the user may need to wait for a period of time. However, in such a waiting period, the user cannot determine whether the collection has started, and an eye posture deviation of the user easily occurs, causing poor precision of a collected feature point. Therefore, if the user can view an eye action of the user in real time in a collection process, the user can adjust an eye posture in a timely way based on the virtual eye model under a prompt of the text prompt information, so that a feature point of the eye can be more accurately obtained, and precision of collecting an eye physiological feature is improved.

In another aspect, because the virtual model simulates a real-time eye action of the user, the VR client device can directly perform liveness detection based on the output virtual eye model on the user from which an eye physiological feature is collected, so as to alleviate a problem that an unauthorized user uses a user identity through a fraud means such as an eye image.

Certainly, the created virtual model can be output to the user from which an eye physiological feature is collected in the VR environment, as described above, and in addition, in practice, user assistance from a third party may exist for eye physiological feature collection performed on the user.

Therefore, in this case, the VR terminal device can be associated with the third-party terminal device in advance, and the VR terminal device can also transmit the created virtual model to the associated third-party terminal device to synchronously output the virtual model.

The previous associated third-party terminal device can be a local terminal device that is in the same network as the VR terminal device worn by the user, or can be a remote device that is connected to the VR terminal device worn by the user by using the Internet. In practice, the associated third-party terminal device can be customized by the user through the user interface of the VR terminal device. Details are omitted in this implementation for simplicity.

For example, the third-party terminal device can be a PC terminal device. In a process that the VR terminal device invokes the carried biometric recognition camera to collect the iris feature and the eye print feature of the user, the VR terminal device can output the virtual model in the VR environment, and send the virtual model to the PC terminal device through a communication link with the PC terminal device to synchronously output the virtual model.

As such, a third-party user other than the user (for example, a person who assists the user in completing eye physiological feature collection) can also view an eye action of the user in real time.

(4) Authentication on a User Identity

In this implementation, when the VR terminal device receives the user identity authentication request that is initiated by the user by triggering the target service in the VR environment, the VR terminal device can first initiate a query to the service server based on the user identifier of the user, and query whether the user identifier of the user has been bound to an eye print feature sample and an iris feature sample.

If the identifier information of the user is currently not bound to any form of eye physiological feature sample, or is bound to one of an eye print characteristic sample and an iris characteristic sample, it indicates that the user has not completed a complete registration procedure. The VR client device can output prompt information indicating "whether to register an eye print and iris" through a user interface to the user, and provide a corresponding user option, so that the user chooses to determine whether to enable the eye print and iris registration procedure or not.

When the user chooses to enable the eye print and iris registration procedure, the VR client device can repeat the eye print and iris registration procedure shown above, and output the previous prompt interface in the VR environment, to notify the user that collection and registration of the eye print feature and the iris feature are completed. Details are omitted in this implementation for simplicity.

Certainly, if the identifier information of the user has been successfully bound to the eye print feature sample and the iris feature sample, the following operations are performed.

In one aspect, in this case, the VR terminal device can still output the previous prompt interface used to notify the user that collection of an eye physiological feature is completed in the VR environment, to notify the user that precise collection of an eye print feature and an iris feature is completed. The prompt interface can still include the previous prompt information and the previous virtual eye model. Details are omitted for simplicity.

In another aspect, the VR terminal device can invoke eye recognition hardware to collect an eye print feature and an iris feature of the user. In a process that the VR terminal device invokes the previous eye recognition hardware to collect an eye physiological feature of the user, the VR terminal device can further invoke predetermined brightness detection hardware (such as a light sensor) to perform brightness detection on a collection environment in the VR terminal device to obtain a brightness value, and determine whether the detected brightness value is lower than a predetermined threshold. If the detected brightness value is lower than the predetermined threshold, it indicates that the brightness value of the collection environment in the VR terminal device is relatively low. The relatively low brightness value may affect collection precision. In this case, the VR terminal device can immediately enable the LED light source to perform light compensation on the camera.

In this implementation, when the VR terminal device successfully collects the eye print feature and the iris feature of the user by invoking the eye recognition hardware, the VR terminal device can interact with the service server based on the collected eye print feature to complete identity authentication for the user.

In a shown implementation, the previous service server can enable eye print and iris recognition services, and provide an identification interface for a VR client device.

For example, when the service server is a service platform built based on a server cluster, an identification server that provides an eye print recognition service and an iris recognition service for the VR terminal device can be enabled, and an access interface is provided for the VR client device.

After successfully collecting the eye print feature and the iris feature of the user, the VR terminal device can construct an eye print verification request based on the account information currently used by the user to log in to the VR client device, and the collected eye print feature and iris feature of the user, then access the eye print identification interface provided by the service server, and submit the eye print verification request to the service server.

After receiving the eye print verification request from the VR client device, the service server can parse the eye print verification request, obtain the eye print feature, iris feature, and account information of the user that are carried in the request, query the eye print feature sample and the iris feature sample that are registered by the user in the previous feature database based on the account information, and then compare the eye print feature and the iris feature with the eye print feature sample and the iris feature sample that are stored in the previous predetermined feature database and that are registered by the user.

In this implementation, by default, the service server can compare one of an eye print feature and an iris feature of the user with a corresponding feature sample in the previous feature database, and perform authentication on the identity of the user based on a comparison result.

In practice, a default type of an eye physiological feature that is used by the service server and a default comparison sequence may not be limited. By default, an eye print feature can be compared with an eye print feature sample that is registered by the user in the previous feature database, or by default, an iris feature can be compared with an iris feature that is registered by the user in the previous feature database.

When the service server compares one of an eye print feature and an iris feature of the user with a corresponding feature sample in the previous feature database, it is determined that one of the eye physiological features is consistent with a corresponding eye physiological feature sample that is registered by the user. In this case, the service server can determine that identity authentication on the user succeeds, and then return an authentication result to the VR terminal device.

Otherwise, when the service server compares one of an eye print feature and an iris feature of the user with a corresponding feature sample in the previous feature database, it is determined that one of the eye physiological features is inconsistent with a corresponding eye physiological feature sample that is registered by the user (in this case, the inconsistency may be caused by distortion of a collected eye physiological feature). The service server can continue to compare the other eye physiological feature in the eye print feature and the iris feature of the user with a corresponding feature sample in the previous feature database, perform identity authentication on the user again based on a comparison result, and then return a corresponding identity authentication result to the VR terminal device.

It is worthwhile to note that the authentication result returned by the service server to the VR terminal device can be a return value of a Boolean type (that is, false and true).

For example, when identity authentication on the previous user succeeds, the service server can return a return value "true" to the VR terminal device. Otherwise, if the security authentication fails, the service server can return a return value "false" to the VR terminal device.

In a shown implementation, comparison results between the previous plurality of types of collected eye physiological features and corresponding eye physiological features that are registered by the user can all be used as references to perform identity authentication on the user. In addition, in an application scenario with a higher security requirement, at least some of the comparison results can be used as references to perform identity authentication on the user.

That at least some of the comparison results can be used as references means that the comparison results can be used as the only factor for determining whether identity authentication on the user succeeds, or used as one of a plurality of factors for determining whether the identity authentication on the user succeeds, when it is determined whether the identity authentication on the user succeeds.

It is worthwhile to note that, the VR terminal device can upload the collected eye print feature and the collected iris feature of the user to the service server, and the service server performs identity authentication on the user based on the eye print feature and the iris feature, in practice, the previous identity authentication process can also be locally completed by the VR terminal device.

In this case, the user can locally reserve an eye print feature and an iris feature on the VR terminal device, and bind the eye print feature and the iris feature to the user's account information locally. When receiving the user identity authentication request, the VR terminal device can collect an eye print feature and an iris feature of the user, and perform identity authentication on the user based on the previously described implementation process that is the same as that of the service server. Details are omitted for simplicity in a specific implementation process.

In this implementation, after identity authentication on the user succeeds, the VR terminal device can execute the target service.

When the target service is an online service, the VR terminal device can execute the service by performing further service interaction with the service server.

In this case, after the VR terminal device receives the security authentication result that is returned by the service server for the target service, if the security authentication succeeds (for example, a return value "true" is returned), the VR terminal device can output a service interface that corresponds to the target service in the VR environment, and collect a service parameter related to the target service through the service interface to construct a service request. The VR terminal device can submit the service request to the service server by accessing a service access interface provided by the service server for the VR terminal device, and perform further service interaction with the service server to complete the target service.

For example, when the previous target service is a quick payment service in a VR environment, the VR terminal device can output a payment interface, collect service parameters related to the payment service such as user information, order information, and price information through the payment interface, then construct a corresponding payment request, and send the payment request to the service server. The service server processes the payment request to complete a payment procedure.

Certainly, if the target service is a local service of the VR terminal device, the service can be executed locally in response to a result that security authentication of the local service succeeds.

For example, when the previous target service is a local unlocking service for the VR terminal device, if the VR terminal device finds that the collected eye print feature of the user is consistent with the eye print feature sample registered by the user after comparison, the VR terminal device can be directly unlocked.

The following describes the technical solutions of the present application with reference to an application environment in which a user performs quick and secure payment in a VR environment by using an eye print feature and an iris feature of the user that are collected by eye recognition hardware carried in the VR terminal device when experiencing VR shopping.

Certainly, it is worthwhile to note that the previous application scenario is merely an example and is not intended to the present application. Apparently, in practice, the technical solutions of the present application can also be applied to other similar service scenarios.

For example, in a VR game scenario, the user can quickly complete game coin recharging by using an eye print and an iris. In a VR live broadcasting scenario, the user can quickly complete rewarding by using an eye print and iris. In a VR video scenario, the user can quickly complete video on demand payment by using an eye print and an iris. The user can quickly unlock the VR terminal device in a VR scene by using an eye print, an iris, etc. Examples are omitted in this implementation for simplicity.

Figure 3:
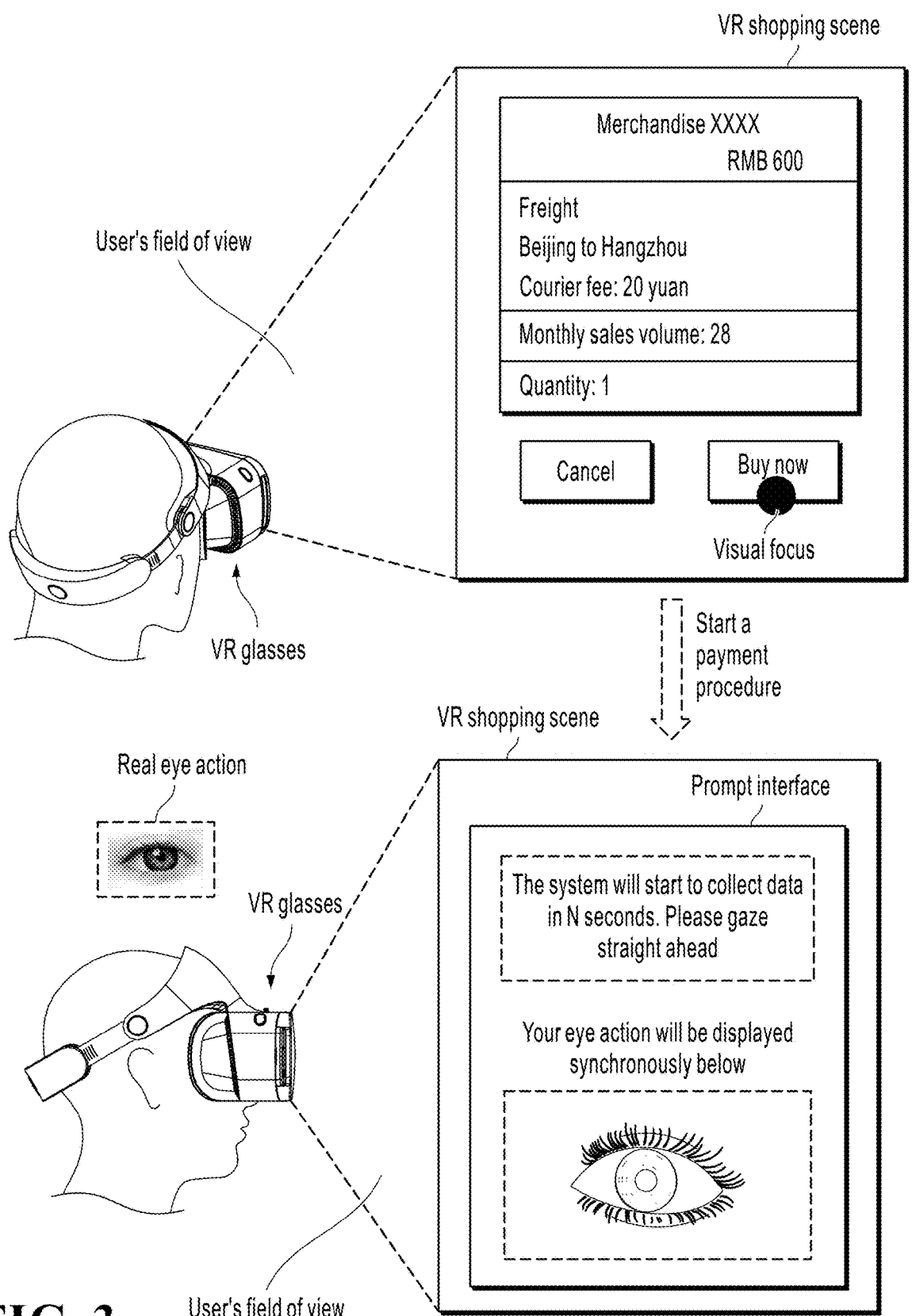
FIG. 3 is a schematic interaction diagram illustrating an example that a user completes quick payment by using an eye physiological feature in a VR environment, according to an implementation of the present application.

FIG. 3 is a schematic interaction diagram illustrating an example that a user completes quick payment by using an eye physiological feature in a VR environment, according to an implementation.

As shown in FIG. 3, in this scenario, the previous target service can be a quick payment service in the VR environment. The previous VR terminal device can be a head-mounted VR terminal device that carries payment client software (for example, VR PAY in ALIPAY) developed based on the VR technology. The service server can be a payment server, for example, the ALIPAY platform constructed based on a server cluster.

In an initial status, the user can log in to the VR terminal device by using the payment account, complete registration of the eye print and the iris by using the VR terminal device, bind the eye print and the iris of the user to the payment account, and store the eye print and the iris in a feature database on the side of the cloud payment server.

In a registration process, the VR client device can output a prompt interface used to notify the user that collection of an eye print feature and an iris feature is completed in the VR environment.

In one aspect, the prompt interface can include text prompt information used to notify the user that collection of an eye physiological feature is completed. For example, in the previous prompt interface shown in FIG. 3, the previous text prompt information is "The system will start to collect data in N seconds. Please gaze straight ahead".

In another aspect, the prompt interface can further include a virtual eye model. The virtual eye model can simulate the eye action of the user in real time when the user's eye moves.

Under a prompt of the prompt interface, the user can view an eye action of the user in real time in a process that the VR terminal device collects an eye print feature and an iris feature of the user. As such, an eye posture can be adjusted in a timely way under a prompt of the prompt interface, and it is ensured that in a registration process, an iris feature sample and an eye print feature sample that are collected by an RGB camera and an infrared camera that are invoked by the VR terminal device can be collected relatively precisely.

When the user wears the VR terminal device to experience VR shopping, the user can present several merchandises that can be selected by the user in the VR environment. The user can view a list of merchandises provided in the VR environment to buy a desirable merchandise.

Still referring to FIG. 3, after selecting a satisfactory merchandise from the previous merchandise list, the user can control a position of a visual focus in a VR environment in a natural interaction way such as eyeball rotation, and can trigger the VR client device to start a payment procedure for the merchandise by suspending, for N seconds, the visual focus above an area where a "Buy now" button provided in advance in the VR environment is located.

Still referring to FIG. 3, after the payment procedure for the merchandise is started, the user can initiate a user identity authentication request to the VR terminal device by using the payment client device. After receiving the user identity authentication request, the VR terminal device can output the previous prompt interface in the VR environment.

Under a prompt of the prompt interface, the user can view an eye action of the user in real time in a process that the VR terminal device collects an eye print feature and an iris feature of the user. As such, an eye posture can be adjusted in a timely way under a prompt of the prompt interface, and it is ensured that an iris feature and an eye print feature that are collected by an RGB camera and an infrared camera that are invoked by the VR terminal device can be collected relatively precisely.

After collection of the eye print and the iris of the user is completed, the VR terminal device can construct a verification request based on the collected eye print feature and iris feature, and the payment account used by the user, and submit the verification request to a payment server. The payment server compares one of the eye print feature and the iris feature of the user with a corresponding eye physiological feature sample that is registered by the user. If one of the eye print feature and the iris feature of the user is consistent with a corresponding eye physiological feature sample that is registered by the user, identity authentication on the user succeeds, and the payment server can return a return value "true" of a Boolean type to the VR terminal device.

If one of the eye print feature and the iris feature of the user is inconsistent with a corresponding eye physiological feature sample that is registered by the user, the payment server can further compare the other eye physiological feature in the eye print feature and the iris feature with a corresponding eye physiological feature sample registered by the user. If the other eye physiological feature in the eye print feature and the iris feature is consistent with a corresponding eye physiological feature sample registered by the user, identity authentication on the user succeeds, and the payment server can return a return value "true" of a Boolean type to the VR terminal device.

After receiving the security authentication success result returned by the payment server, the VR terminal device can output a payment interface, collect parameters related to the payment service such as user information, order information, and price information through the payment interface, then construct a corresponding payment request, and send the payment request to the payment server. The payment server processes the payment request to complete quick payment for the merchandise.

It is worthwhile to additionally note that, the technical carriers involved in the payment in this implementation of the present application can include, for example, a Near Field Communication (NFC) technology, a WIFI technology, a 3G/4G/5G technology, a POS card reading technology, a two-dimensional barcode scanning technology, a barcode scanning technology, a Bluetooth technology, an infrared technology, a short message service (SMS), and a multimedia messaging service (MMS).

The present application further provides an apparatus implementation that corresponds to the previous method implementation.

Figure 4:
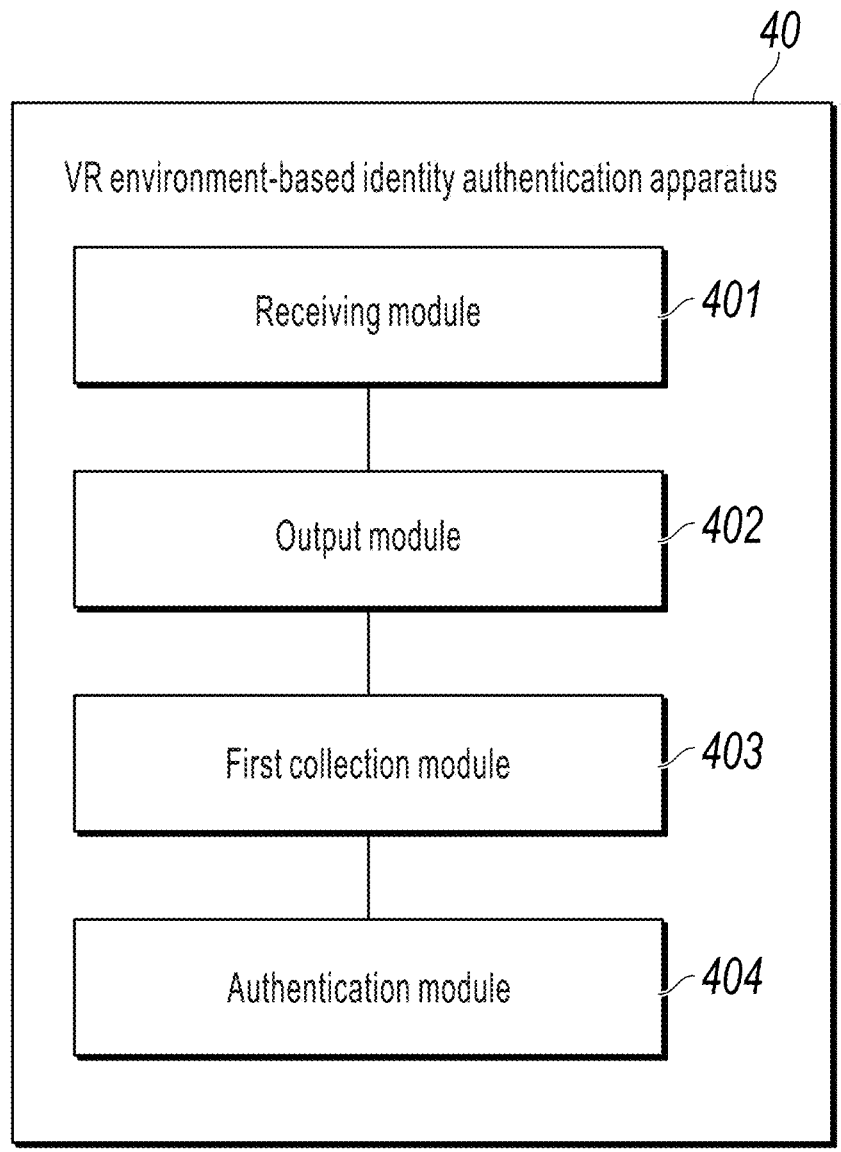
FIG. 4 is a logical block diagram illustrating a VR environment-based identity authentication apparatus, according to an implementation of the present application.

Referring to FIG. 4, the present application provides a VR environment-based identity authentication apparatus 40 applied to a VR terminal device.

Figure 5:
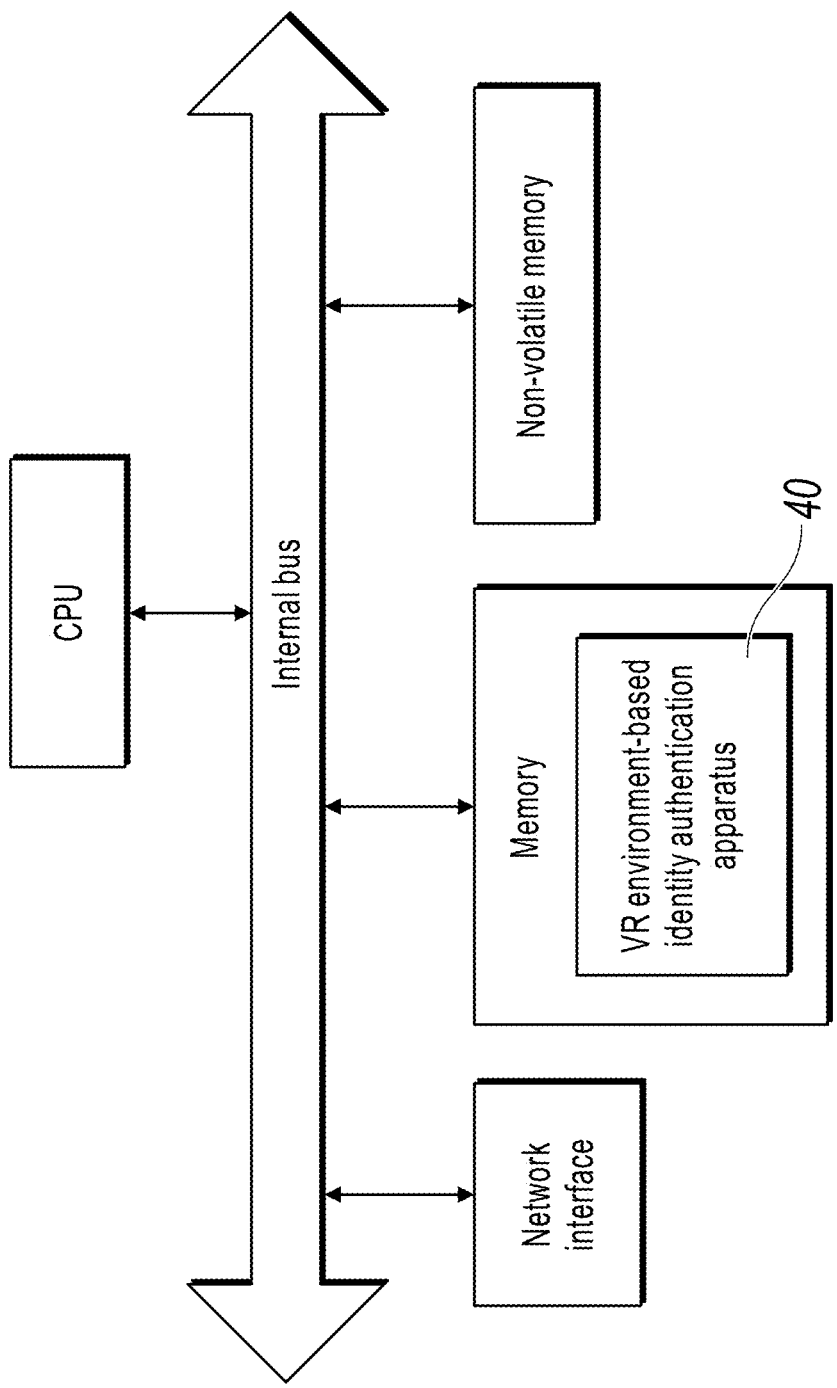
FIG. 5 is a structural diagram illustrating hardware of a VR terminal device including a VR environment-based identity authentication apparatus, according to an implementation of the present application.

Referring to FIG. 5, a hardware architecture involved in the VR terminal device that carries the VR environment-based identity authentication apparatus 40 usually includes a CPU, a memory, a non-volatile memory, a network interface, an internal bus, etc. In an example of a software implementation, the VR environment-based identity authentication apparatus 40 can usually be understood as a logical apparatus of a software and hardware combination obtained after the CPU runs a computer program loaded in the memory. The apparatus 40 includes the following: a receiving module 401, configured to receive a user identity authentication request; an output module 402, configured to output a prompt interface that is used to notify a user that collection of an eye physiological feature is completed in a virtual reality environment, where the prompt interface includes a virtual eye model, and when the user's eye moves, the virtual eye model simulates an eye action of the user; a first collection module 403, configured to collect the eye physiological feature of the user; and an authentication module 404, configured to perform identity authentication on the user based on the collected eye physiological feature.

In this implementation, the apparatus 40 further includes the following: a second collection module 405 (not shown in FIG. 4), configured to collect eye action data of the user; and an adjustment module 406 (not shown in FIG. 4), configured to adjust the virtual eye model based on the collected eye action data.

In this implementation, the second collection module 405 is configured to: invoke a predetermined camera to collect an eye image of the user; extract an eye feature point that corresponds to the eye action of the user from the collected eye image; perform motion tracking on the eye feature point; and collect coordinate change data of the eye feature point.

In this implementation, the virtual reality terminal device is associated with a third-party terminal device.

The output module 402 is further configured to: send the prompt interface including the virtual eye model to the associated third-party terminal device, to synchronously output the prompt interface on the third-party terminal device.

In this implementation, the eye physiological feature includes an eye print feature and an iris feature.

In this implementation, the eye includes an eyelid, an eye corner, an iris, and a sclera.

In this implementation, the eye action includes at least one of an eyeball rotation action, an eye blinking action, or an eye opening action.

In this implementation, an eye feature point that corresponds to an eyeball rotation action of the user includes an iris feature point or a sclera feature point, and eye feature points that correspond to an eye blinking action and an eye opening action of the user include an eyelid feature point or an eye corner feature point.

A person skilled in the art can easily figure out another implementation solution of the present application after considering the present specification and practicing the disclosed invention here. The present application is intended to cover any variations, functions, or adaptive changes of the present application. These variations, functions, or adaptive changes comply with general principles of the present application, and include common knowledge or a commonly used technical means in the technical field that is not disclosed in the present application. The present specification and the implementations are merely considered as examples. The actual scope and the spirit of the present application are pointed out by the following claims.

It should be understood that the present application is not limited to the accurate structures described above and shown in the accompanying drawings, and modifications and changes can be made without departing from the scope of the present application. The scope of the present application is limited only by the appended claims.

The previous descriptions are merely examples of implementations of the present application, but are not intended to limit the present application. Any modification, equivalent replacement, or improvement made without departing from the spirit and principle of the present application should fall within the protection scope of the present application.

Figure 6:
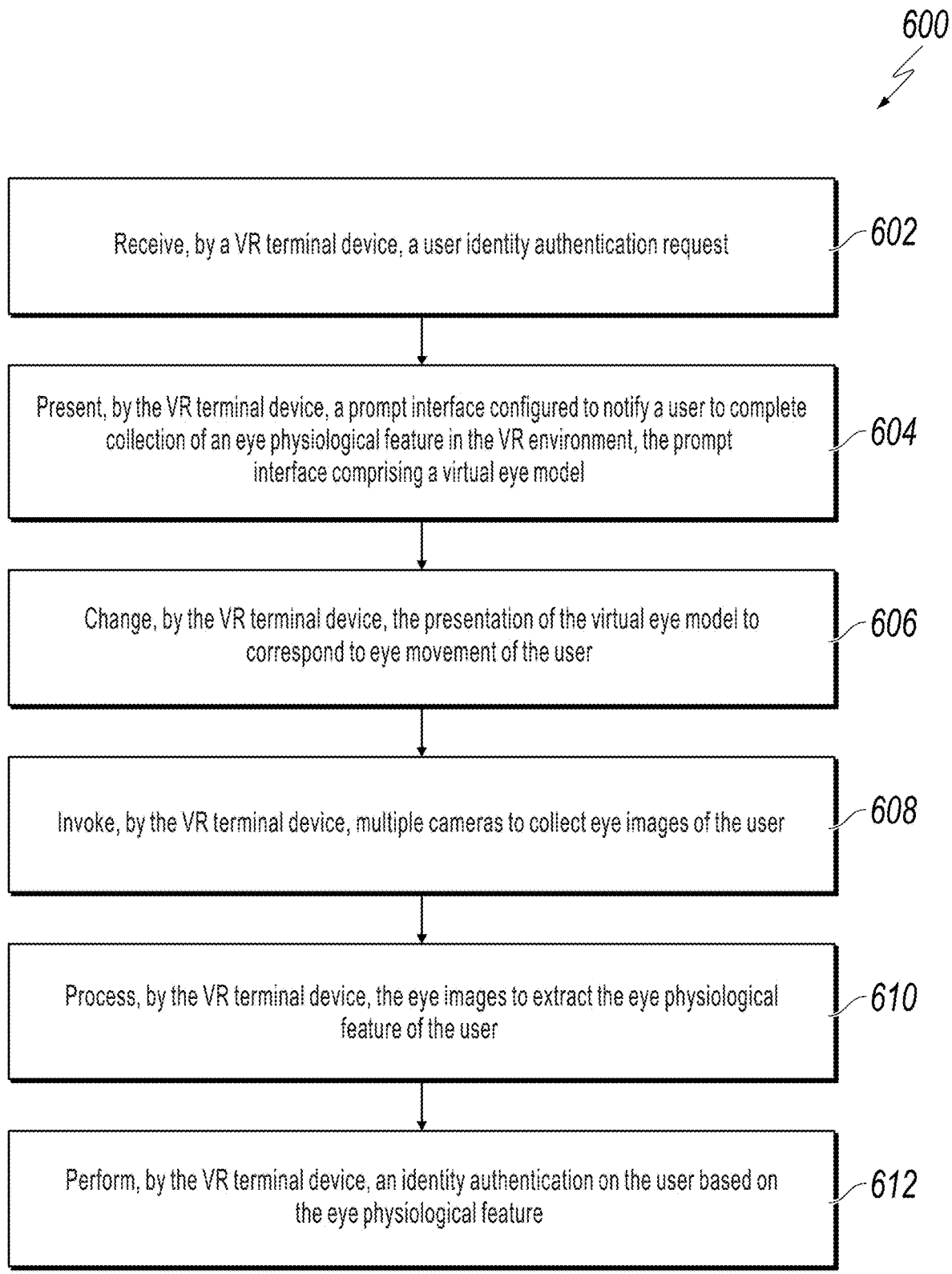
FIG. 6 is a flowchart illustrating an example of a computer-implemented method for user identity authentication in a VR environment, according to an implementation of the present disclosure.

FIG. 6 is a flowchart illustrating an example of a computer-implemented method 600 for user identity authentication in a VR environment, according to an implementation of the present disclosure. For clarity of presentation, the description that follows generally describes method 600 in the context of the other figures in this description. However, it will be understood that method 600 can be automatically performed, for example, by any system, environment, software, and hardware, or a combination of systems, environments, software, and hardware, as appropriate. In some implementations, various steps of method 600 can be run in parallel, in combination, in loops, or in any order.

At 602, a VR terminal device receives a user identity authentication request. In some implementations, a voice instruction can be received to trigger a target service configured to generate the user identity authentication request. For example, when a user wears the VR terminal device and wants to use a service (such as, a payment service), the user can send a voice instruction to initiate identity authentication without taking off the VR terminal device. From 602, method 600 proceeds to 604.

At 604, a prompt interface configured to notify a user to complete collection of an eye physiological feature in the VR environment is presented by the VR terminal device. In some implementations, the prompt interface includes a virtual eye model. The virtual eye model can simulate eye movement of the user. In some implementations, the eye physiological feature includes an eye print feature and an iris feature. In some implementations, the eye includes at least one of an eyelid, an eye corner, an iris, and a sclera. In some implementations, the eye movement includes at least one of an eyeball rotation, an eye blinking movement, and an eye opening movement.

In some implementations, presenting the virtual eye model in the VR environment includes collecting data of the eye movement of the user, and adjusting the presented virtual eye model based on the collected data of the eye movement of the user. For example, multiple cameras can be invoked to collect eye images corresponding to the eye movement of the user. At least one eye feature point that corresponds to the eye movement of the user can be extracted from the eye images corresponding to the eye movement of the user. Motion tracking can be performed on the at least one eye feature point. Coordinate change data of the at least one eye feature point can be collected. For example, at least one eye feature point that corresponds to the eyeball rotation can include at least one iris feature point or at least one sclera feature point. At least one eye feature point that corresponds to the eye blinking movement or the eye opening movement can include at least one eyelid feature point or at least one eye corner feature point. From 604, method 600 proceeds to 606.

At 606, the presentation of the virtual eye model is changed by the VR terminal device to correspond to eye movement of the user. For example, a determination can be made as to whether an eye of the user moves. In response to a determination that the eye of the user moves, the presented virtual eye model can be updated to correspond to the eye movement of the user. From 606, method 600 proceeds to 608.

At 608, multiple cameras are invoked by the VR terminal device to collect eye images of the user. For example, the multiple cameras can be invoked by the VR terminal device to collect in parallel eye images of the user. In some implementations, the multiple cameras can include at least one of an RGB camera and an infrared camera. In some implementations, the eye images can be processed to determine a brightness value. A determination can be made as to whether the brightness value is lower than a predetermined threshold. In response to a determination that the brightness value is lower than the predetermined threshold, a light source can be enabled to perform light compensation on at least one of the multiple cameras. From 608, method 600 proceeds to 610.

At 610, the eye images are processed by the VR terminal device to extract the eye physiological feature of the user. For example, the VR terminal device can automatically extract several feature points from the eye image, and then input the extracted feature point as an input parameter into a modeling tool in the VR terminal device to perform modeling to complete creation of the virtual eye model. From 610, method 600 proceeds to 612.

At 612, an identity authentication is performed by the VR terminal device on the user based on the eye physiological feature. In some implementations, the VR terminal device can be associated with a third-party terminal device. The prompt interface comprising the virtual eye model can be sent to the associated third-party terminal device. For example, the associated third-party terminal device can synchronously output the prompt interface. After 612, method 600 stops.

Identity authentication using physiological features can be used to provide security in a virtual reality (VR) environment. Normally, physiological features of a user are not presented to the user during collection process. The subject matter described in this specification provides an interactive interface for identity authentication using physiological features in the VR environment. For example, a prompt interface is presented to notify a user to complete collection of an eye physiological feature in the VR environment. The prompt interface includes a virtual eye model that simulates eye movement of the user in real time. The user can view the virtual eye model to adjust an eye posture in a timely way during collection process. As a result, precision of collecting the eye physiological feature can be improved, thereby decreasing interaction complexity, and improving identity authentication efficiency and user experience during identity authentication process in the VR environment.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for identity authentication in a virtual reality (VR) environment, comprising:
   receiving, by a VR terminal device, a user identity authentication request of a user for at least one target service of a plurality of target services;
   establishing, by the VR terminal device, a status of an account of the user with a service server;
   presenting, by the VR terminal device, a prompt interface configured to notify the user to complete collection of an eye physiological feature in the VR environment, wherein the prompt interface displays an animated virtual eye model, and the animated virtual eye model is created using a modeling tool;
   in response to real-time eye movement of the user, updating, by the VR terminal device, the displayed animated virtual eye model to simulate the real-time eye movement of the user, wherein the real-time eye movement comprises at least one of an eyeball rotation, an eye blinking movement, and an eye opening movement;
   invoking, by the VR terminal device, a plurality of cameras to collect eye images of the user;
   processing, by the VR terminal device, the eye images to extract the eye physiological feature of the user;
   sending, by the VR terminal device, the eye physiological feature to the service server to perform an identity authentication on the user based on the eye physiological feature; and
   displaying, by the VR terminal device and based on an identity authentication response from the service server, a service interface associated with the at least one target service for the user to conduct the at least one target service.

2. The computer-implemented method of claim 1, wherein displaying the animated virtual eye model in the VR environment comprises:
   collecting data of the real-time eye movement of the user; and
   adjusting the displayed animated virtual eye model based on the collected data of the real-time eye movement of the user.

3. The computer-implemented method of claim 2, wherein collecting data of the real-time eye movement of the user comprises:
   invoking the plurality of cameras to collect eye images corresponding to the real-time eye movement of the user;
   extracting, from the eye images corresponding to the real-time eye movement of the user, at least one eye feature point that corresponds to the real-time eye movement of the user;
   performing motion tracking on the at least one eye feature point; and
   collecting coordinate change data of the at least one eye feature point.

4. The computer-implemented method of claim 1, further comprising:
   associating the VR terminal device with a third-party terminal device; and
   sending the prompt interface comprising the animated virtual eye model to the associated third-party terminal device, wherein the associated third-party terminal device synchronously outputs the prompt interface.

5. The computer-implemented method of claim 1, wherein the eye physiological feature comprises an eye print feature and an iris feature, and wherein an eye comprises at least one of an eyelid, an eye corner, an iris, and a sclera.

6. The computer-implemented method of claim 5, wherein at least one eye feature point that corresponds to the eyeball rotation comprises at least one iris feature point or at least one sclera feature point, and wherein at least one eye feature point that corresponds to the eye blinking movement or the eye opening movement comprises at least one eyelid feature point or at least one eye corner feature point.

7. The computer-implemented method of claim 1, further comprising receiving a voice instruction to trigger a target service configured to generate the user identity authentication request, and wherein the plurality of cameras comprises at least one of an RGB camera and an infrared camera.

8. The computer-implemented method of claim 1, further comprising:
processing the eye images to determine a brightness value;
determining whether the brightness value is lower than a predetermined threshold; and
in response to determine that the brightness value is lower than the predetermined threshold, enabling a light source to perform light compensation on at least one of the plurality of cameras.

9. The computer-implemented method of claim 1, wherein updating, by the VR terminal device, the displayed animated virtual eye model to simulate the real-time eye movement of the user includes:
determining that an eye of the user moves; and
in response to determining that the eye of the user moves, updating the displayed animated virtual eye model to simulate the real-time eye movement of the user.

10. A non-transitory, computer-readable medium storing one or more instructions executable by a computer system to perform operations comprising:
receiving, by a virtual reality (VR) terminal device, a user identity authentication request of a user for at least one target service of a plurality of target services;
establishing, by the VR terminal device, a status of an account of the user with a service server;
presenting, by the VR terminal device, a prompt interface configured to notify the user to complete collection of an eye physiological feature in a VR environment, wherein the prompt interface displays an animated virtual eye model, and the animated virtual eye model is created using a modeling tool;
in response to real-time eye movement of the user, updating, by the VR terminal device, the displayed animated virtual eye model to simulate the real-time eye movement of the user, wherein the real-time eye movement comprises at least one of an eyeball rotation, an eye blinking movement, and an eye opening movement;
invoking, by the VR terminal device, a plurality of cameras to collect eye images of the user;
processing, by the VR terminal device, the eye images to extract the eye physiological feature of the user;
sending, by the VR terminal device, the eye physiological feature to the service server to perform an identity authentication on the user based on the eye physiological feature; and
displaying, by the VR terminal device and based on an identity authentication response from the service server, a service interface associated with the at least one target service for the user to conduct the at least one target service.

11. The non-transitory, computer-readable medium of claim 10, wherein displaying the animated virtual eye model in the VR environment comprises:
collecting data of the real-time eye movement of the user; and
adjusting the displayed animated virtual eye model based on the collected data of the real-time eye movement of the user.

12. The non-transitory, computer-readable medium of claim 11, wherein collecting data of the real-time eye movement of the user comprises:
invoking the plurality of cameras to collect eye images corresponding to the real-time eye movement of the user;
extracting, from the eye images corresponding to the real-time eye movement of the user, at least one eye feature point that corresponds to the real-time eye movement of the user;
performing motion tracking on the at least one eye feature point; and
collecting coordinate change data of the at least one eye feature point.

13. The non-transitory, computer-readable medium of claim 10, the operations further comprising:
associating the VR terminal device with a third-party terminal device; and
sending the prompt interface comprising the animated virtual eye model to the associated third-party terminal device, wherein the associated third-party terminal device synchronously outputs the prompt interface.

14. The non-transitory, computer-readable medium of claim 10, wherein the eye physiological feature comprises an eye print feature and an iris feature, and wherein an eye comprises at least one of an eyelid, an eye corner, an iris, and a sclera.

15. The non-transitory, computer-readable medium of claim 14, wherein at least one eye feature point that corresponds to the eyeball rotation comprises at least one iris feature point or at least one sclera feature point, and wherein at least one eye feature point that corresponds to the eye blinking movement or the eye opening movement comprises at least one eyelid feature point or at least one eye corner feature point.

16. The non-transitory, computer-readable medium of claim 10, the operations further comprising receiving a voice instruction to trigger a target service configured to generate the user identity authentication request, and wherein the plurality of cameras comprises at least one of an RGB camera and an infrared camera.

17. The non-transitory, computer-readable medium of claim 10, the operations further comprising:
processing the eye images to determine a brightness value;
determining whether the brightness value is lower than a predetermined threshold; and
in response to determine that the brightness value is lower than the predetermined threshold, enabling a light source to perform light compensation on at least one of the plurality of cameras.

18. The non-transitory, computer-readable medium of claim 10, wherein updating, by the VR terminal device, the displayed animated virtual eye model to simulate the real-time eye movement of the user includes:
determining that an eye of the user moves; and
in response to determining that the eye of the user moves, updating the displayed animated virtual eye model to simulate the real-time eye movement of the user.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  receiving, by a virtual reality (VR) terminal device, a user identity authentication request of a user for at least one target service of a plurality of target services;
  establishing, by the VR terminal device, a status of an account of the user with a service server;
  presenting, by the VR terminal device, a prompt interface configured to notify the user to complete collection of an eye physiological feature in a VR environment, wherein the prompt interface displays an animated virtual eye model, and the animated virtual eye model is created using a modeling tool;
  in response to real-time eye movement of the user, updating, by the VR terminal device, the displayed animated virtual eye model to simulate the real-time eye movement of the user, wherein the real-time eye movement comprises at least one of an eyeball rotation, an eye blinking movement, and an eye opening movement;
  invoking, by the VR terminal device, a plurality of cameras to collect eye images of the user;
  processing, by the VR terminal device, the eye images to extract the eye physiological feature of the user;
  sending, by the VR terminal device, the eye physiological feature to the service server to perform an identity authentication on the user based on the eye physiological feature; and
  displaying, by the VR terminal device and based on an identity authentication response from the service server, a service interface associated with the at least one target service for the user to conduct the at least one target service.

20. The computer-implemented system of claim 19, wherein displaying the animated virtual eye model in the VR environment comprises:
  collecting data of the real-time eye movement of the user; and
  adjusting the displayed animated virtual eye model based on the collected data of the real-time eye movement of the user.

* * * * *

UNITED STATES PATENT AND TRADEMARK OFFICE
CERTIFICATE OF CORRECTION

PATENT NO. : 10,846,388 B2
APPLICATION NO. : 16/507944
DATED : November 24, 2020
INVENTOR(S) : Yin et al.

Page 1 of 1

It is certified that error appears in the above-identified patent and that said Letters Patent is hereby corrected as shown below:

On the Title Page

Other Publications, Column 2, Line 2, delete "Technica" and insert -- Technical --, therefor.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*